(12) United States Patent
Peters

(10) Patent No.: US 7,569,091 B1
(45) Date of Patent: Aug. 4, 2009

(54) COMPOUND FERTILIZERS AND METHOD OF PRODUCING THEM

(76) Inventor: Robert B. Peters, P.O. Box 468, Lovingston, VA (US) 22949

( * ) Notice: Subject to any disclaimer, the term of this patent is extended or adjusted under 35 U.S.C. 154(b) by 578 days.

(21) Appl. No.: 11/213,572

(22) Filed: Aug. 26, 2005

(51) Int. Cl.
C05D 9/02 (2006.01)

(52) U.S. Cl. .................................................. 71/1

(58) Field of Classification Search .............. 47/62 N, 47/48.5, 56, 58.1 R, 58.1 SC, 1.01 R, 79, 47/DIG. 10; 71/1, 31–53
See application file for complete search history.

(56) References Cited

U.S. PATENT DOCUMENTS

| | | |
|---|---|---|
| 1,864,947 A | 6/1932 | Slefridge |
| 2,756,544 A | 7/1956 | Rosgen |
| 2,983,075 A | 5/1961 | Mizusawa |
| 3,330,290 A | 7/1967 | Proter |
| 3,592,386 A | 7/1971 | Tschudy |
| 3,993,466 A | 11/1976 | Knudsen et al. |
| 4,177,052 A | 12/1979 | Entzmann et al. |
| 4,240,818 A | 12/1980 | Sololov |
| 4,328,025 A | 5/1982 | Whitcomb |
| 4,447,253 A | 5/1984 | Young |
| 4,500,335 A | 2/1985 | Fenn |
| 4,545,396 A | 10/1985 | Miller et al. |
| 4,704,160 A | 11/1987 | McVey |
| 5,112,379 A | 5/1992 | Young |
| 5,114,459 A | 5/1992 | Peters et al. |
| 5,135,174 A | 8/1992 | Chaplinsky |
| 5,171,349 A | 12/1992 | Vetanovetz |
| 5,354,726 A | 10/1994 | Narayanan et al. |
| 5,395,418 A | 3/1995 | Vetanovetz |
| 5,435,821 A | 7/1995 | Duvdevani et al. |
| 5,435,823 A | 7/1995 | Crispoldi |
| 5,454,849 A | 10/1995 | Rehbein et al. |
| 5,454,850 A | 10/1995 | Biamonte et al. |
| 5,476,528 A | 12/1995 | Trimm et al. |
| 5,494,498 A | 2/1996 | Young |
| 5,549,729 A | 8/1996 | Yamashita |
| 5,652,196 A | 7/1997 | Luthra et al. |
| 5,668,719 A | 9/1997 | Bobrov et al. |
| 5,731,265 A | 3/1998 | Hou |
| 5,768,128 A | 6/1998 | Thompson et al. |
| 5,797,976 A | 8/1998 | Yamashita |
| 5,862,628 A | 1/1999 | Takashima |
| 5,958,104 A | 9/1999 | Nonomura |
| 5,997,602 A | 12/1999 | Aijala |

(Continued)

OTHER PUBLICATIONS 2-page advertising document titled "Jack's Professional Labels" Produced by J. R. Peters, Inc. 6656 Grant Way, Allentown, PA 18106.

(Continued)

Primary Examiner—T. Nguyen
(74) Attorney, Agent, or Firm—Denis O'Brien

(57) ABSTRACT

The present invention provides 1) a convenient and novel method for prescribing constituent nutrients in a compound fertilizer that takes into account ambient concentrations of one or more of the nutrients in the irrigation water; 2) a convenient and novel method of prescribing the constituents of compound fertilizers based on predetermined ratios between a desired final concentration of an index nutrient and a desired concentration of at least one non-index nutrient; and, 3) a convenient and novel method of formulating compound fertilizers by providing a graduated series of stocks that accommodate wide variation in ambient concentrations of an index nutrient in local irrigation waters.

16 Claims, 2 Drawing Sheets

U.S. PATENT DOCUMENTS

| | | |
|---|---|---|
| 6,206,946 B1 | 3/2001 | Hayashi |
| 6,241,795 B1 | 6/2001 | Svec et al. |
| 6,309,440 B1 | 10/2001 | Yamashita |
| 6,312,493 B1 | 11/2001 | Eltink et al. |
| 6,318,023 B1 | 11/2001 | Yamashita |
| 6,549,851 B2 | 4/2003 | Greensides |
| 6,749,659 B1 | 6/2004 | Yu et al. |
| 6,838,504 B1 | 1/2005 | Webster et al. |
| 6,858,058 B2 | 2/2005 | Daniels |
| 6,874,277 B2 | 4/2005 | Yamashita |
| 6,878,179 B2 | 4/2005 | Porubean |
| 2003/0167811 A1 | 9/2003 | Porubean |
| 2004/0069032 A1 | 4/2004 | Krysiak |
| 2005/0126238 A1 | 6/2005 | Lovatt |
| 2005/0138978 A1 | 6/2005 | Porubean |

OTHER PUBLICATIONS 2-page advertising document titled "Jack's Professional PPM & E.C." Produced by J. R. Peters, Inc. 6656 Grant Way, Allentown, PA.
6-page advertising document titled "Jack's Professional—Product Descriptions." Produced by J. R. Peters, Inc. 6656 Grant Way, Allentown, PA.

COMPOUND FERTILIZERS AND METHOD OF PRODUCING THEM

CROSS-REFERENCE TO RELATED APPLICATIONS

Not applicable.

FEDERALLY FUNDED RESEARCH

Not applicable.

SEQUENCE LISTING OR PROGRAM

Not applicable.

BACKGROUND OF THE INVENTION

1. Field of the Invention

The present invention relates to methods for formulating compound fertilizers, including prescribing optimum ratios, quanta, and concentrations of constituent nutrients of compound fertilizers.

2. Scope and Usage of Certain Terms

The following lexicon sets forth the intended scope and meaning of certain terms and concepts used in the present specification and claims. The definitions set forth below include singular, plural, and grammatical variations of the terms defined.

Compound fertilizer–a mixture, formulation, or blend of two or more constituent nutrients, with or without non-nutrient supplements.

Stock—a supply of compound fertilizer, whether in solid (blend) or liquid (solution) form, formulated and held for future use.

Prescribe—to set forth or determine the type and the concentration and/or quantum of one or more constituents, including constituent nutrients, of a compound fertilizer.

Determine—unless explicitly narrowed, any process or activity employed to ascertain information such as, without limitation, actual values, theoretical values, quanta, ratios, and conditions.

Primary nutrient—a member of the class of essential plant nutrients comprising nitrogen (N), phosphorous (P), and potassium (K), frequently referred to collectively as "macro-nutrients" because they are required by plants in relatively large amounts.

Secondary nutrient—a member of the class of essential plant nutrients comprising calcium (Ca), magnesium (Mg), and sulfur (S).

Tertiary nutrient—a member of the class of essential plant nutrients comprising all essential plant nutrients not classified as primary or secondary. While there is no universal agreement as to the precise membership of this class, there is a general consensus that the following nutrients are tertiary nutrients: iron (Fe), manganese (Mn), copper (Cu), zinc (Zn), molybdenum (Mo), chlorine (Cl), and boron (B). Because of the relatively small amounts of these nutrients required by plants, they are frequently referred to as "micro-nutrients."

Concentration—unless limited explicitly or by context, "concentration" is used broadly to include, for example, percent by weight, mass per volume, volume per volume, and parts per million (ppm). Concentration values are denoted herein by inclusion within square brackets ([ ]).

Irrigation water—is used in a broad context to include water, regardless of the source, that is applied to plants as an addition to or as an alternative to natural rain water.

Supplemented—refers to the addition of nutrients and/or other fertilizer constituents to irrigation water. Irrigation water to which nutrients and/or other fertilizer constituents have been added is referred to herein as "supplemented irrigation water."

Ambient—refers to the composition or contents of irrigation water prior to supplementation. "Ambient" used to modify a nutrient refers to the naturally occurring quantum or concentration of the nutrient in the irrigation water prior to supplementation or alteration. An ambient concentration is denoted herein by square brackets and a subscript "a" ($[\ ]_a$). "Ambient pH" refers to the pH of the irrigation water prior to supplementation or alteration.

Exogenous—refers to a nutrient and/or the quantum or concentration of a nutrient used to supplement irrigation water.

Index nutrient, non-index nutrient—"index nutrient" ($Nu_i$) refers to a constituent nutrient of a compound fertilizer to which the quantum or concentration of at least one other nutrient in the compound fertilizer is pegged. "Non-index nutrient" refers to any constituent nutrient of a compound fertilizer other than the index nutrient.

Final concentration and final pH—respectively, the concentration of a substance in, or the pH of, irrigation water after the irrigation water has been supplemented according to the methods disclosed herein. A final concentration is denoted herein by square brackets and a subscript "f" ($[Nu_i]_f$). The "target" or "desired" final concentration or pH is the final concentration of the nutrient or the final pH that is to be achieved by the methods disclosed herein.

Index ratio, $R_i$—the ratio between the final concentrations of an index nutrient and a non-index nutrient of a compound fertilizer.

3. Statement of the Problem Solved by the Invention

The problem solved by the present invention is how to prescribe the constituent nutrients of a compound fertilizer—particularly those formulated as "off-the-shelf" products"—in a way that takes into account variations in the ambient concentration of at least one of the constituent nutrients. This problem is of primary concern to those in the arts of agriculture and horticulture because plants must have access to each essential nutrient in at least a minimal amount in order to survive, yet most essential nutrients also have a toxic level above which the plant will die. Thus, for each essential nutrient there is a concentration range that must be adhered to, referred to herein as the "nutritional range." If the level of only one essential nutrient falls outside this nutritional range, the plant will not thrive. The nutritional ranges of the primary nutrients are relatively wide, but with respect to the tertiary nutrients the difference between insufficient amounts and toxic amounts is quite narrow. Furthermore, the nutritional range and optimal concentration of a given nutrient may vary as a function of the plant's life cycle, ambient light, pH of the environment, and other variables.

Compounding this difficulty of determining the proper amounts or concentrations of multiple nutrients in compound fertilizers is the fact that nutrients when blended together can interact with each other, with counter ions, or with the solvent, normally water, in untoward ways. For instance, nutritionally beneficial concentrations of Ca or Mg in a compound fertilizer tend to precipitate from solution. This is an even more significant problem in areas having "hard" irrigation water; i.e., water with high ambient concentrations of Ca or Mg. The resulting precipitates can remove free nutrient from use by the plant and clog irrigation and spraying equipment. Nonchelated tertiary nutrients, if employed with many common phosphorus compounds, also tend to precipitate from solution. Consequently, in order to attain and maintain desired predetermined ratios of essential nutrients, one must be cognizant of and avoid counterproductive physiochemical conditions and interactions that alter the amount of free nutrients available for uptake by the plant.

4. Existing Art

The problem of ensuring that multiple nutrients are applied within their nutritional ranges has been traditionally addressed by ascertaining optimal ratios between the various components of the compound fertilizer. For instance, N—P—K fertilizers are commonly available in a variety of predetermined N:P:K ratios to accommodate diverse plant nutritional needs and environmental conditions. The literature contains many examples of the way nutrient ratios are determined and manipulated to carefully control the application rates of the nutrients. Commonly, nutrients in compound fertilizers are present in fixed ratios to exogenous nitrogen, without reference to ambient concentrations of N or Ca, or any other nutrient. U.S. Pat. No. 5,768,128 to Thompson et al. discloses a complex method of producing nutrient requirement maps for agricultural fields and using that information to formulate and apply appropriate fertilizer blends differentially to various areas of the field. Peters et al. (U.S. Pat. No. 5,114,459) disclose adjusting the ratio of ammoniacal nitrogen to nitrate nitrogen in compound fertilizer as a function of the amount of ambient light to which the plant is exposed. Greensides (U.S. Pat. No. 6,549,851) discloses a computer-based method of determining optimal amounts and ratios of plant nutrients based upon repeated plant tissue analysis during the growing season.

Avoiding untoward interactions between nutrients in a compound fertilizer is also a topic that is well addressed in the literature. The inclusion of chelating agents such as EDTA (ethylenediaminetetraacetic acid) to compound fertilizers is one common means for reducing precipitation of secondary and tertiary nutrients. For example, Vetanovetz et al. (U.S. Pat. No. 5,171,349) advocate using urea phosphate as the phosphate source in order to minimize precipitation of nonchelated secondary and tertiary nutrients, while Daniels (U.S. Pat. No. 6,858,058) discloses the inclusion of excess chelating or sequestering agents in the compound fertilizer.

Two major shortcomings of the foregoing methods and all other known methods of formulating compound fertilizers are: 1) they ignore the primary role played by Ca and the Ca:N ratio in plant nutrition, and 2) they fail to take into account ambient concentrations of nutrients, particularly ambient concentrations of Ca. While it is not uncommon to custom blend compound fertilizers based on ambient concentrations of one or more nutrients in the irrigation water, presently there is no method or system for conveniently prescribing ready-made fertilizer formulations that will provide reasonably precise and predetermined nutrient ratios over a wide variation of ambient nutrient concentrations, particularly ambient Ca. What is needed is a convenient and economical method of prescribing amounts or concentrations of nutrients in a compound fertilizer based on predetermined nutrient ratios and the ambient concentration of at least one index nutrient.

BRIEF SUMMARY OF THE INVENTION

The present invention is a novel method of prescribing optimal quanta or concentrations of constituent nutrients in a compound fertilizer based upon the ambient concentration of an index nutrient ($[Nu_i]_a$) and a desired final concentration of the index nutrient ($[Nu_i]_f$), wherein the quanta or concentrations of all non-index nutrients are based on predetermined ratios ($R_i$) to the desired final quantum or concentration of the index nutrient. The fertilizer thus formulated, when applied at a rate that produces a desired N load, will also produce the target final concentration of the index nutrient, as well as optimal or desired concentrations of the non-index nutrients. The method has the further novel advantage of providing a graduated series of stocks that can conveniently and economically accommodate wide variations in the ambient concentrations of the index nutrient in local irrigation waters, thus obviating the need to produce custom compound fertilizers for each source of water.

A first object of the invention is to provide a convenient method of formulating compound fertilizers that takes into account ambient concentrations of one or more constituent nutrients as determined by analysis of the irrigation water.

A second object of the invention is to provide a convenient method of prescribing ratios of the constituent nutrients a compound fertilizer based on the final concentration of an index nutrient.

A third object of the invention is to provide a convenient method of formulating compound fertilizers based on predetermined ratios between a desired final concentration of an index nutrient and a desired final concentration of at least one non-index nutrient.

A fourth object of the invention is to provide a convenient method of formulating compound fertilizers by providing a graduated series of stocks that accommodates wide variation in ambient concentrations of an index nutrient in local irrigation waters.

DETAILED DESCRIPTION OF THE INVENTION

1. Preferred Mode of Practicing the Invention

The inventive concepts and novel features of my invention are described herein with reference to specific embodiments and variations thereof that represent, collectively, the best mode known to me of practicing the invention. The steps of my method may be easily comprehended with respect to the preferred embodiments; however, it is to be noted that these disclosures are representative of many possible embodiments that incorporate the inventive concepts of my invention. The embodiments disclosed herein are intended as illustrations; they are not intended to limit the scope of the claims and their permissible equivalents. For instance, upon comprehending the following disclosures it will be obvious to those reasonably competent in the art that the steps disclosed below may be practiced in a variety of sequences without deviating from the metes and bounds of the claims.

Figure 1:
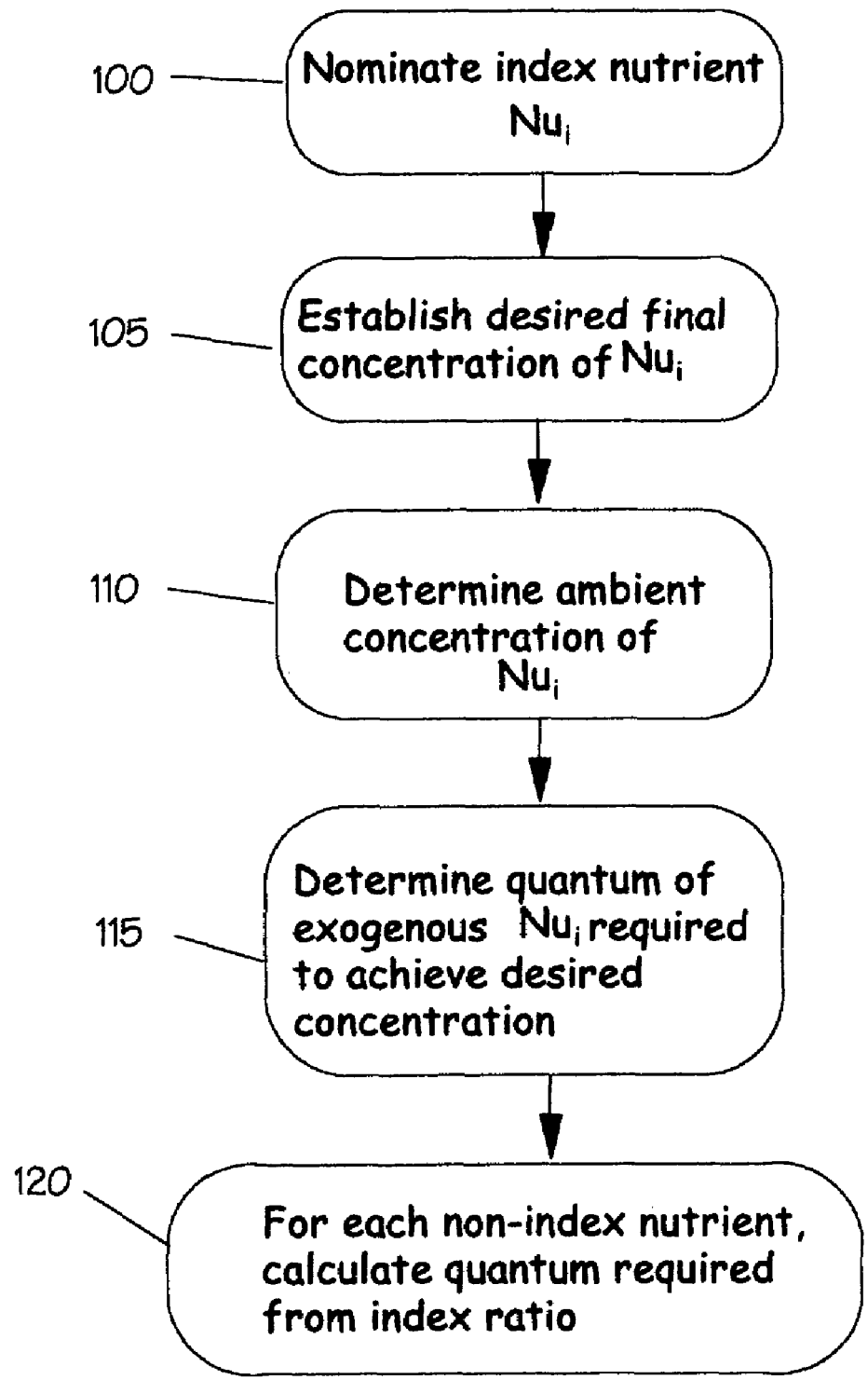
FIG. 1 is a flow diagram of a preferred method of formulating a compound fertilizer.

The steps of the preferred embodiment of my invention are summarized in FIG. 1. At step 100 an essential nutrient is nominated as the index nutrient, $Nu_i$. My experience has been that in most circumstances it is preferable to nominate a secondary nutrient as $Nu_i$, and more particularly, Ca. There are at least two advantages of nominating Ca as $Nu_i$. First, irrigation water varies enormously with respect to ambient concentrations of Ca. As disclosed below, by nominating Ca as the index, one can easily compensate for the large variation in ambient Ca and thereby achieve greater precision in controlling the final concentration of Ca ($[Ca]_f$) and the final pH. Second, the ratio of [N] to [Ca] is a very efficacious index ratio for ensuring optimal plant growth and health. For instance, as is well known in the art, a [N]/[Ca] ratio of about 2.5 yields optimal results in most cases and for most plant species. However, in specific cases a [N]/[Ca] ratio of from about 1.5 to about 4.0 may be optimal, depending upon the species, soil specifications, and other factors both known and unknown. But regardless of the [N]/[Ca] ratio employed, by nominating Ca as $Nu_i$ one acquires a more precise control over the ratio because ambient Ca is taken into account, as described below. Consequently, a preferred embodiment of my invention is to elect Ca as $Nu_i$ at step 100.

At step 105 one selects a desired final concentration of $Nu_i$ that one wishes to achieve in the supplemented irrigation water applied to the plants. This choice is arbitrary and will be determined by variables such as specific growing conditions and plant species. Where Ca has been selected as $Nu_i$, a final [Ca] of 80 ppm is generally desirable. Table I provides examples of values for final concentrations for five primary and secondary nutrients. These concentration values are widely accepted in the art as being optimal for plant growth under a wide variety of conditions, but they can be adjusted as needed to meet a grower's particular situation.

TABLE I

| Nutrient | Final concentration (ppm) |
|---|---|
| Ca | 80 |
| N | 200 |
| $P_2O_5$ | 50 |
| $K_2O$ | 250 |
| Mg | 40 |

At step 110 one tests the irrigation water to determine $[Nu_i]_a$, the ambient concentration of $Nu_i$. This is done by employing well known and readily available analytical techniques for measuring concentrations of nutrients. In many situations where the irrigation water has already been tested or where water from a near-by source has been tested, data that are deemed to be sufficiently accurate may be available that can be relied upon for determining $[Nu_i]_a$ and it may not be necessary to test the irrigation water. The objective of this step is simply to obtain a reliable value for $Nu_i$ from existing data or analysis of the irrigation water.

At step 115 one computes the amount of exogenous $Nu_i$ that must be added to the irrigation water in order to attain the desired $[Nu_i]_f$, the final concentration of $Nu_i$. This computation and those of step 125 are based on the known volume of irrigation water to which the nutrients will be added. The choice of this volume is arbitrary and is determined on a case-by-case basis.

Next, at step 120, for each of non-index nutrient, y, to be included in the fertilizer, one applies a predetermined value for the index ratio, $R_i$, (by definition, $[Nu_i]/[y]_f$) to compute the quantum of y to be added to the irrigation water. This computation can be carried out in at least two ways. First, $[y]_f$ is derived from $R_i$ and $[Nu_i]_f$ and the quantum of y is then calculated on the basis of the known final volume of irrigation water. Or, second, the quantum of exogenous $Nu_i$ computed at step 115 is multiplied by the $R_i$ appropriate to each y in order to yield the quantum of y required.

Table II discloses a preferred set of index ratios for eleven primary, secondary, and tertiary nutrients, based on Ca as the index nutrient. These ratios have proven effective in a variety of growing conditions and with respect to many plant species. Such a set of index ratios may be determined on the basis of experience with a given crop or locality, or on the basis of easily conducted experiments. By using these index ratios and the desired $[Ca]_f$ one can easily compute final concentrations for each nutrient to be added to the irrigation water, in the manner described above. If a user prefers to elect a nutrient other than Ca as the $Nu_i$, the values in Table II can be easily re-calculated to accommodate that choice.

TABLE II

| Nutrient, y | $R_i$ ($[Ca]/[y]_f$) | Nutrient, y | $R_i$ ($[Ca]/[y]_f$) |
|---|---|---|---|
| B | 0.0025 | Ca | 1 |
| Cu | 0.0025 | N | 2.5 |
| Fe | 0.0125 | $P_2O_5$ | 0.63 |
| Mn | 0.0063 | $K_2O$ | 3.13 |
| Mo | 0.0013 | Mg | 0.5 |
| Zn | 0.0063 | | |

Once the quanta of the index and non-index nutrients are determined, the irrigation water is then supplemented by diluting the proper quanta of nutrients into the final volume of irrigation water.

2. Details, Embellishments, and Variations a. Graduated Stocks

Having carried out the computations and calculations of steps 100-120, the user can easily carry out step 125 by directly supplementing the final volume of irrigation water with the proper quanta of nutrients as disclosed in the foregoing paragraphs. However, it is often more desirable, particularly from a commercial point of view, to formulate stocks of the fertilizer and then dilute or dissolve the stocks into the final volume of irrigation water just prior to application.

In the preferred embodiment, where Ca is elected as the index nutrient, the prescribed amounts of exogenous Ca and all exogenous non-index nutrients ultimately depend upon $[Ca]_a$, but $[Ca]_a$ varies widely depending on the source of the irrigation water. Consequently, it is most convenient to practice the method of my invention by formulating a graduated series of stocks that will achieve the desired final concentration of Ca for a wide range of anticipated ambient Ca concentrations in irrigation waters.

Tables IIIa and IIIb disclose such a series of seventeen stocks based on a desired $[Ca]_f$ of 80 ppm. Preferred percent-weight nutrient content values are provided for the primary and secondary nutrients (Table IIIa) and for the tertiary nutrients (Table IIIb). The series is designed so that ambient Ca concentrations from 0 ppm to 80 ppm are accommodated in 5 ppm differentials. The size of the differential is arbitrary and can be modified as necessary without undue experimentation to accommodate regional variations in irrigation water, market considerations, and the degree of precision that growers require. The series disclosed in Tables IIIa and IIIb is designed to produce a final Ca concentration of approximately 80 ppm and a N loading of approximately 200 ppm when an appropriate amount is dissolved into irrigation water having an ambient Ca concentration indicated in the column labeled $[Ca]_a$.

TABLE IIIa

| | | Nutrient content (% weight) | | | | | |
|---|---|---|---|---|---|---|---|
| Stock # | $[Ca]_a$ (ppm) | Ca | N | $P_2O_5$ | $K_2O$ | Mg | Citric acid (lb/ton) |
| 1 | 0 | 5.12 | 12.80 | 3.20 | 16.00 | 2.56 | 10.00 |
| 2 | 5 | 4.91 | 13.10 | 3.27 | 16.37 | 2.46 | 11.75 |
| 3 | 10 | 4.69 | 13.40 | 3.35 | 16.75 | 2.35 | 12.35 |
| 4 | 15 | 4.46 | 13.72 | 3.43 | 17.15 | 2.23 | 13.53 |
| 5 | 20 | 4.22 | 14.05 | 3.51 | 15.57 | 2.11 | 14.70 |
| 6 | 25 | 3.96 | 14.31 | 3.60 | 18.02 | 1.98 | 15.88 |
| 7 | 30 | 3.69 | 14.77 | 3.69 | 18.47 | 1.85 | 17.05 |

TABLE IIIa-continued

| | | Nutrient content (% weight) | | | | | |
|---|---|---|---|---|---|---|---|
| Stock # | $[Ca]_a$ (ppm) | Ca | N | $P_2O_5$ | $K_2O$ | Mg | Citric acid (lb/ton) |
| 8 | 35 | 3.41 | 15.16 | 3.79 | 18.95 | 1.71 | 18.23 |
| 9 | 40 | 3.11 | 15.57 | 3.89 | 19.46 | 1.56 | 19.40 |
| 10 | 45 | 2.80 | 16.00 | 4.00 | 20.00 | 1.40 | 20.58 |
| 11 | 50 | 2.47 | 16.49 | 4.12 | 20.61 | 1.24 | 21.75 |
| 12 | 55 | 2.12 | 16.92 | 4.23 | 21.15 | 1.06 | 22.93 |
| 13 | 60 | 1.74 | 17.46 | 4.36 | 21.79 | 0.87 | 24.10 |
| 14 | 65 | 1.33 | 17.67 | 4.42 | 22.09 | 0.88 | 25.28 |
| 15 | 70 | 0.90 | 17.92 | 4.48 | 22.40 | 0.90 | 26.45 |
| 16 | 75 | 0.45 | 18.16 | 4.54 | 22.70 | 0.91 | 27.63 |
| 17 | 80 | 0.00 | 18.43 | 4.61 | 23.03 | 0.92 | 30.00 |

TABLE IIIb

| | | Nutrient content (% weight) | | | | | |
|---|---|---|---|---|---|---|---|
| Stock # | $[Ca]_a$ (ppm) | B | Cu | Fe | Mn | Mo | Zn |
| 1 | 0 | .0128 | .0128 | .0640 | .0320 | .0064 | .0320 |
| 2 | 5 | .0131 | .0131 | .0660 | .0330 | .0066 | .0330 |
| 3 | 10 | .0134 | .0134 | .0670 | .0335 | .0067 | .0335 |
| 4 | 15 | .0137 | .0137 | .0690 | .0350 | .0069 | .0350 |
| 5 | 20 | .0141 | .0141 | .0710 | .0360 | .0071 | .0360 |
| 6 | 25 | .0143 | .0143 | .0720 | .0360 | .0072 | .0360 |
| 7 | 30 | .0148 | .0148 | .0740 | .0370 | .0074 | .0370 |
| 8 | 35 | .0152 | .0152 | .0760 | .0380 | .0076 | .0380 |
| 9 | 40 | .0156 | .0156 | .0780 | .0390 | .0078 | .0390 |
| 10 | 45 | .0160 | .0160 | .0800 | .0400 | .0080 | .0400 |
| 11 | 50 | .0165 | .0165 | .0830 | .0420 | .0083 | .0420 |
| 12 | 55 | .0169 | .0169 | .0850 | .0425 | .0085 | .0425 |
| 13 | 60 | .0174 | .0174 | .0870 | .0435 | .0087 | .0435 |
| 14 | 65 | .0177 | .0177 | .0890 | .0445 | .0089 | .0445 |
| 15 | 70 | .0179 | .0179 | .0900 | .0450 | .0090 | .0450 |
| 16 | 75 | .0182 | .0182 | .0980 | .0454 | .0091 | .0454 |
| 17 | 80 | .0184 | .0184 | .0922 | .0461 | .0092 | .0461 |

Figure 2:
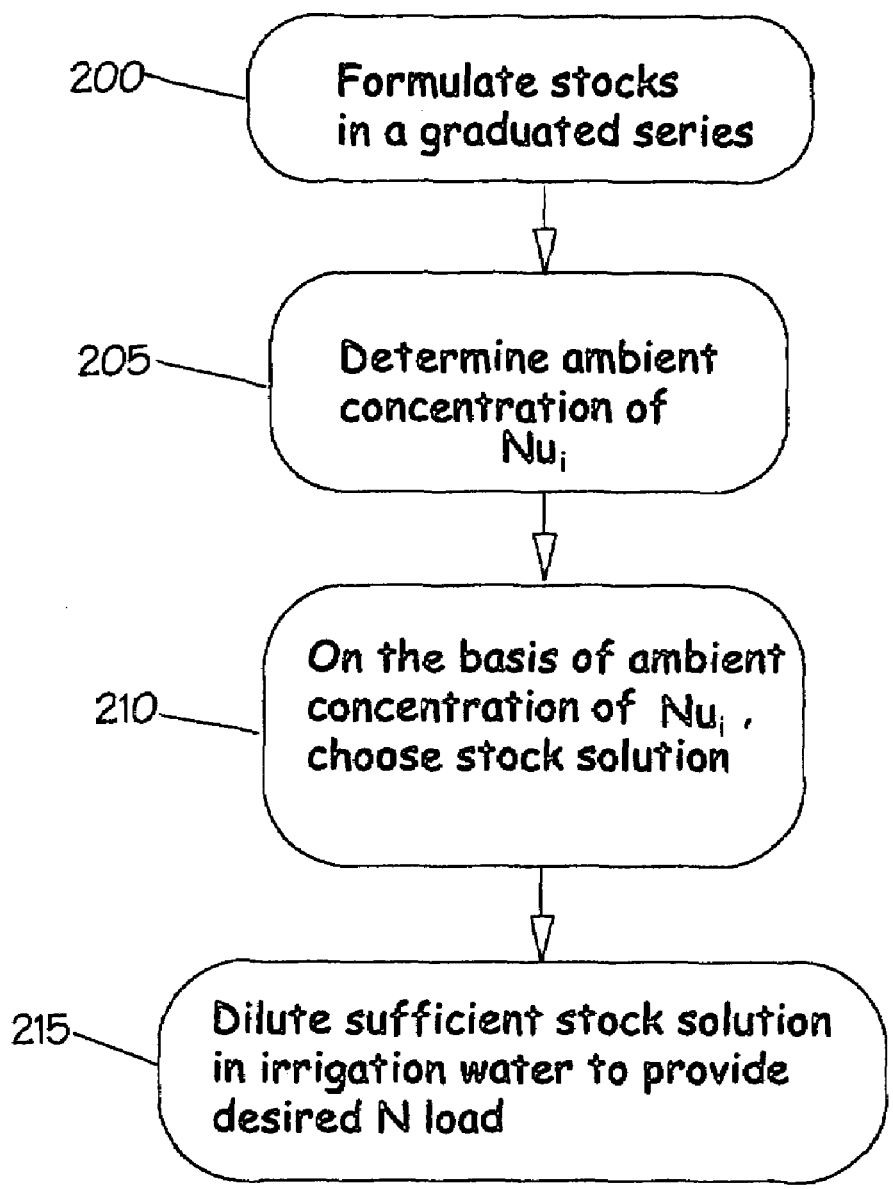
FIG. 2 is a flow diagram of a preferred method of producing stock blends or solutions.

The manner in which graduated stocks are prescribed and utilized is illustrated in more detail in FIG. 2. In an illustrative example, Ca is the index nutrient, the ambient Ca concentration is 54 ppm, and the user desires to apply sufficient fertilizer to produce a N loading of 200 ppm, which is a very common N loading value in the art.

At step 200 a series of stocks is formulated by referring to Tables IIIa and IIIb. This step may be carried out by the grower or, more conveniently, by the supplier or manufacturer of the fertilizer. Generally, the grower will have a single source of irrigation water, and, hence, will have no need for an entire series of stocks, but the provider or retail source will want to maintain a series of stocks in order to be able to accommodate variations in ambient Ca over a wide geographical area.

At step 205 $[Ca]_a$ is determined by analyzing the irrigation water or by referring to existing data deemed to be accurate. At step 210 the user simply refers to the second column of Table IIIa to determine the closest stock formula for $[Ca]_a$ as determined at step 205. For instance, in the present example, ground water having a $[Ca]_a$ of 54 ppm is being used as irrigation water. Therefore, stock #12 is preferred in order to achieve a desired $[Ca]_f$ of approximately 80 ppm.

At step 215 a sufficient amount of stock #12 is diluted into a sufficient volume of irrigation water to yield the desired N loading. In the hypothetical example given, 15.8 ounces of stock #12 diluted into 100 gallons of irrigation water having an ambient Ca concentration of 54 ppm will produce a final N loading of 200 ppm, a $[Ca]_f$ of approximately 80 ppm, and the approximate optimal final concentrations of other nutrients that are included in the stock in the quanta prescribed in Tables IIIa and IIIb.

b. Constituent Nutrients and Supplements

It is to be noted that my method does not require that all essential nutrients, nor any specific combination of nutrients, be included in the compound fertilizer. At a minimum, two nutrients—one of which is nominated as the index nutrient, and the other one of which is nominated as a non-index nutrient—are required in order to practice the method. While virtually any combination of nutrients may be prescribed in amounts determined by my method, in many situations it will be sufficient or most practicable to prescribe a relatively simple stock consisting of three or four nutrients, for instance the primary nutrients plus Ca. If necessary for a specific application, tertiary nutrients can be added in amounts prescribed by alternative methods. It is not necessary that the amounts or concentrations of every constituent nutrient of the compound fertilizer be determined by my method or that they be pegged to the index nutrient.

Nor does my method of prescribing nutrients for a compound fertilizer preclude the use of non-nutrient substances or amendments. For instance, chelating agents, amendments, acids, and alkalies may be included in the compound fertilizer in amounts that are not determined by reference to the index nutrient.

c. pH Control-means

It is well known in the art that most plants, "normal growth plants," do best when the pH of the fertilizer is maintained at from about 6.0 to about 6.5. Acid-loving plants prefer a pH of from about 5.0 to about 5.5. When utilizing Ca as the referent or index nutrient the final pH will largely be determined by the amount of exogenous Ca compound added to the irrigation water. Thus, one can provide approximate pH control by incorporating into each graduated stock a quantum of acid predetermined from the known amount of exogenous Ca required to supplement the irrigation water.

This approach to pH control can be implemented by adding to each stock the quantum of citric acid indicated in the far right-hand column of Table IIIa. This will achieve a final pH of from about 6.0 to about 6.5 as the $[Ca]_a$ varies from 0 to 80 ppm.

Of course, it will be recognized that with acidic fertilizer formulas or unusually acidic irrigation water, the pH control-means may be a base instead of an acid. However, the same principles will apply and a determination of the type and quantum of the pH control-means for any given fertilizer blend or irrigation water pH can be easily computed without undue experimentation and incorporated into the stocks.

In general, after determining a desired final pH, the grower selects an appropriate type of pH control-means and then calculates the quantum of that pH means required to achieve the desired final pH, based on the amount of exogenous Ca, which, in turn, is based on the ambient Ca concentration. When the invention is being practiced by producing a graduated series of stocks, an appropriate type and quantum of pH control-means is added to each stock in the series.

SUMMARY

From the figures and the foregoing disclosures, the novelty, utility, and means of practicing my invention will be readily apprehended. It is to be understood that my invention is not limited to the embodiments disclosed above. The metes and bounds of my invention are to be ascertained by referring to the following claims in conjunction with the figures and specification.

I claim:

1. A method for producing a compound fertilizer by supplementing irrigation water with at least two nutrients, said method comprising the steps of:
    (11a) determining the ambient concentration of an index nutrient, $Nu_i$ in the irrigation water;
    (11b) determining a desired final concentration, $[Nu_i]_f$, of $Nu_i$;
    (11c) adding a sufficient quantity of exogenous $Nu_i$ to a volume, V, of the irrigation water to achieve substantially $[Nu_i]_f$;
    (11d) determining a desired concentration, $[y]$, of an additional nutrient, y, wherein $[y]$ is determined by applying a predetermined index ratio, $R_i$, representing a desired ratio of $[Nu_i]_f$ to $[y]$; and,
    (11e) adding a sufficient quantity of y to V to achieve substantially $[y]$ as determined at Step (11d),
    whereby the ratio of $[Nu_i]_f$ to $[y]$ in the supplemented irrigation water is substantially equal to $R_i$.

2. The method of claim 1 wherein $Nu_i$ is a secondary nutrient.

3. The method of claim 1 wherein $Nu_i$ is calcium.

4. The method of claim 3 wherein y is nitrogen.

5. The method of claim 4 wherein $R_i$ is from about 1.5 to about 4.0.

6. The method of claim 4 wherein $R_i$ is approximately 2.5.

7. The method of claim 1 further comprising the steps of:
    (17a) selecting a desired final pH of the supplemented irrigation water;
    (17b) determining the quantity of an acid or a base required to achieve the pH of Step (17a); and,
    (17c) adding to the irrigation water the quantity of the acid or the base determined at Step (17b).

8. The method of claim 7 wherein the desired final pH is from about 6.0 to about 6.5.

9. The method of claim 1 further comprising the steps of:
    (19a) preparing at least one stock containing quantities of $Nu_i$ and y in a ratio that produces $[Nu_i]_f$ of Step (11b) and $[y]$ of Step (11d) when an appropriate amount of the stock is diluted or dissolved in V;
    (19b) determining the appropriate amount of the stock of Step (19la); and,
    (19c) performing both of Step (11c) and Step (11e) by diluting or dissolving in V the stock of Step (19a) in substantially the appropriate amount determined at Step (19b).

10. The method of claim 9 wherein $Nu_i$ is calcium.

11. The method of claim 9 further comprising the step of preparing a graduated series of the stocks of Step (19a) wherein the quantities of $Nu_i$ in the stocks are prescribed to accommodate increasing anticipated ambient concentrations of $Nu_i$ in the irrigation water.

12. The method of claim 11 wherein $Nu_i$ is calcium and the range of anticipated ambient concentrations of $Nu_i$ is from about 0 parts per million (ppm) to about 80 ppm.

13. A compound fertilizer produced by the method of claim 1, said compound fertilizer comprising:
    a. an index nutrient $Nu_i$ present in a desired final concentration, $[Nu_i]_f$;
    b. at least one additional nutrient, y, present in a concentration, $[y]$;
    wherein the ratio of $[Nu_i]_f$ to $[y]$ is substantially equal to a predetermined index ratio, $R_i$.

14. The compound fertilizer of claim 13 wherein $Nu_i$ is calcium.

15. The compound fertilizer of claim 14 wherein y is nitrogen.

16. The compound fertilizer of claim 15 wherein $R_i$ is from about 1.5 to about 4.0.

* * * * *